(12) United States Patent
Michael

(10) Patent No.: US 11,428,098 B2
(45) Date of Patent: Aug. 30, 2022

(54) AUTOMATED SEDIMENTARY FAIRWAY DEFINITION AND APPROACH FOR CALCULATING SEDIMENT INPUT AND OUTPUT LOCATION PARAMETERS PER AREA OF INTEREST

(71) Applicant: SAUDI ARABIAN OIL COMPANY, Dhahran (SA)

(72) Inventor: Nikolaos A. Michael, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/153,449

(22) Filed: Jan. 20, 2021

(65) Prior Publication Data
US 2022/0228480 A1   Jul. 21, 2022

(51) Int. Cl.
*E21B 49/00*   (2006.01)
*G01V 1/30*   (2006.01)
(Continued)

(52) U.S. Cl.
CPC .............. *E21B 49/00* (2013.01); *G01V 1/306* (2013.01); *G06V 10/44* (2022.01); *E21B 7/04* (2013.01)

(58) Field of Classification Search
CPC ........... E21B 49/00; E21B 7/04; G01V 1/306; G06K 9/4604
See application file for complete search history.

(56) References Cited

U.S. PATENT DOCUMENTS 6,246,963 B1   6/2001   Cross et al.
9,816,376 B2 *   11/2017   Pope ..................... E21B 47/10
(Continued)

FOREIGN PATENT DOCUMENTS

CN   103454686 A   12/2013

OTHER PUBLICATIONS

Neal, Jack et al., "Sequence Stratigraphy—A Global Theory for Local Success", Oilfield Review, Seismics, Jan. 1993, pp. 51-62 (12 pages).

(Continued)

*Primary Examiner* — Manuel A Rivera Vargas
*Assistant Examiner* — Yaritza H Perez Bermudez
(74) *Attorney, Agent, or Firm* — Osha Bergman Watanabe & Burton LLP

(57) ABSTRACT

A method including obtaining, for a subterranean region, a set of sedimentary pathways, a sediment attribute map, and an area of interest. From these inputs, a sedimentary fairway, and a sedimentary fairway attribute based on the location of the origin point of each member of the set of sedimentary pathways, and a spatial location of the terminal point of each member of the set of sedimentary pathways are determined. Further, the method includes dividing the sedimentary fairway into one or more sedimentary pathway domains and a sediment attribute profile for each sedimentary pathway domain based on a trajectory of each sedimentary pathway, and determining an intersection of the trajectory of each sedimentary pathway with one or more boundaries of the area of interest. The method also includes determining a sedimentary attribute at the entry points, and a sedimentary attribute at the exit points of the set of sedimentary pathways with the area of interest, and a change in the sedimentary attribute between the entry and exit points.

20 Claims, 9 Drawing Sheets

(51) Int. Cl.
  *G06V 10/44*   (2022.01)
  *E21B 7/04*   (2006.01)

(56) References Cited

U.S. PATENT DOCUMENTS

| | | | |
|---|---|---|---|
| 11,156,744 B2* | 10/2021 | Mallet | G06T 19/00 |
| 2001/0036294 A1 | 11/2001 | Keskes et al. | |
| 2006/0247858 A1* | 11/2006 | Cacas | G01V 1/282 |
| | | | 702/2 |
| 2007/0288168 A1* | 12/2007 | Salles | G01V 11/00 |
| | | | 702/5 |
| 2010/0332210 A1 | 12/2010 | Birdwell et al. | |
| 2017/0167254 A1 | 6/2017 | Fotland | |
| 2019/0212460 A1 | 7/2019 | Zhao et al. | |

OTHER PUBLICATIONS

Michael, Nikolas A. et al., "The Functioning of Sediment Routing Systems Using a Mass Balance Approach: Example from the Eocene of the Southern Pyrenees", The Journal of Geology, The University of Chicago, vol. 121, 2013, pp. 581-606 (26 pages).

Richards, Paul L. and Andrew J. Brenner, "Delineating Source Areas for Runoff in Depressional Landscapes: Implications for Hydrologic Modeling", J. Great Lakes Res., Internat. Assoc. Great Lakes Res., vol. 30, No. 1, 2004, pp. 9-21 (13 pages).

Allen, Philip A. et al., "The Qs problem: Sediment volumetric balance of proximal foreland basin system", Sedimentology:, International Association of Sedimentologists, vol. 60, 2013, pp. 102-130 (29 pages).

Whittaker, Alexander C. et al., "Decoding downstream trends in stratigraphic grain size as a function of tectonic subsidence and sediment supply", GSA Bulletin, Geological Society of America, Jul./Aug. 2011, vol. 123, No. 7/8; 2011, pp. 1363-1382 (20 pages).

Gao, Shu and Michael Collins, "Net sediment transport patterns inferred from grain-sized trends, based upon definition of 'transport vectors'", Sedimentary Geology, Elsevier Science Publishers B.V., vol. 80, 1992, pp. 47-60 (14 pages).

Gao, Shu, "A Fortran Program for Grain-Size Trend Analysis to Define Net Sediment Transport Pathways", Computers & Geosciences, Pergamon, Elsevier Science Ltd., vol. 22, No. 4, 1996, pp. 449-452 (4 pages).

Allen, P. A. and Allen, J. R., "Basin Analysis; Principles And Application To Petroleum Play Assessment. Third Edition", Wiley-Blackwell; Chapter 7; May 2013; pp. 260-282 (23 pages).

International Search Report and Written Opinion issued in Application No. PCT/US2022/013099, dated Apr. 22, 2022 (14 pages).

Conti et al.; "An integrated GIS for sedimentological and geomorphological analysis of a lagoon enviroment. Barra de Cananéia inlet region, (Southeastern Brazil)", Journal of Coastal Conservation; vol. 16; No. 1; Oct. 7, 2011; pp. 13-24 (12 pages).

Arab et al.; "Coupling stratigraphic and petroleum system modeling tools in complex tectonic domains: case study in the North Algerian Offshore", Arabian Journal of Geosciences; vol. 9; No. 4; Mar. 31, 2016; pp. 1-32 (32 pages).

"Chapter 6.0 Statigraphic Modeling", South West Nova Scotia Extension; Jun. 2015; pp. 1-60; XP055911025; Retrieved from the Internet Jul. 6, 2022: URL: https://oera.ca/sites/default/files/2019-05/Chapter%206-%20Stratigraphic%20Modelling.pdf (60 pages).

M. Frignani et al.; "Fine-sediment mass balance in the western Adriatic continental shelf over a century time scale", Marine Geology; vol. 222-223; Nov. 15, 2005; pp. 113-133 (21 pages).

M. Fressard et al.; "A graph theory tool for assessing structural sediment connectivity: Devlopment and application in the Mercury vineyards (France)", Science Of The Total Enviroment; vol. 651; Oct. 14, 2018; pp. 2566-2584 (19 pages).

O. Falivene et al.; "Automatic calibration of stratigraphic forward models for predicting reservoir presence in exploration", AAPG (American Association of Petroleum Geologists) Bulletin; vol. 98; No. 9; Sep. 1, 2014; pp. 1811-1835 (25 pages).

* cited by examiner

AUTOMATED SEDIMENTARY FAIRWAY DEFINITION AND APPROACH FOR CALCULATING SEDIMENT INPUT AND OUTPUT LOCATION PARAMETERS PER AREA OF INTEREST

BACKGROUND

Sedimentary geology deals with understanding the distribution and evolution of sedimentary systems in the subsurface and at the surface, for ancient and modern geological environments. To understand the geological history and the sedimentary systems of a subterranean region it is important to evaluate its spatial distribution of lithologies and grain sizes.

Static and stratigraphic forward modeling reconstruct the distribution of sedimentary parameters in the subsurface and their development over time. Overall modeling uncertainties depend on the cumulative uncertainties of input parameters. Conventionally, key input data for these models, e.g., sediment input and output locations, volumes and fluxes, and lithology and grain size distribution were based entirely on qualitative estimates, estimates based on semi-quantitative sedimentological observations, or on empirical relationships between source and sink area size from modern examples.

Large uncertainties for sedimentary input parameters lead to large uncertainties in the resulting models, sometimes to the extent that the resulting models show little or no relationship to the actual subsurface distributions. An automated method for constraining these crucial parameters is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method including obtaining, for a subterranean region, a set of sedimentary pathways, a sediment attribute map, and an area of interest. From these inputs, a sedimentary fairway, and sedimentary fairway attributes are determined, based on the location of the origin point of each member of the set of sedimentary pathways, and a spatial location of the terminal point of each member of the set of sedimentary pathways. Further, the method includes dividing the sedimentary fairway into one or more sedimentary pathway domains and a sediment attribute profile for each sedimentary pathway domain based on a trajectory of each sedimentary pathway, and determining an intersection of the trajectory of each sedimentary pathway with one or more boundaries of the area of interest. The method also includes determining a sedimentary attribute at the entry points, and a sedimentary attribute at the exit points of the set of sedimentary pathways with the area of interest, and a change in the sedimentary attribute between the entry and exit points.

In general, in one aspect, embodiments relate to a non-transitory computer readable medium storing instructions executable by a computer processor, the instructions including functionality for obtaining, for a subterranean region, a set of sedimentary pathways, a sediment attribute map, and an area of interest. From these inputs, a sedimentary fairway, and sedimentary fairway attributes are determined, based on the location of the origin point of each member of the set of sedimentary pathways, and a spatial location of the terminal point of each member of the set of sedimentary pathways. Further, the method includes dividing the sedimentary fairway into one or more sedimentary pathway domains and a sediment attribute profile for each sedimentary pathway domain based on a trajectory of each sedimentary pathway, and determining an intersection of the trajectory of each sedimentary pathway with one or more boundaries of the area of interest. The method also includes determining a sedimentary attribute at the entry points, and a sedimentary attribute at the exit points of the set of sedimentary pathways with the area of interest, and a change in the sedimentary attribute between the entry and exit points. Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
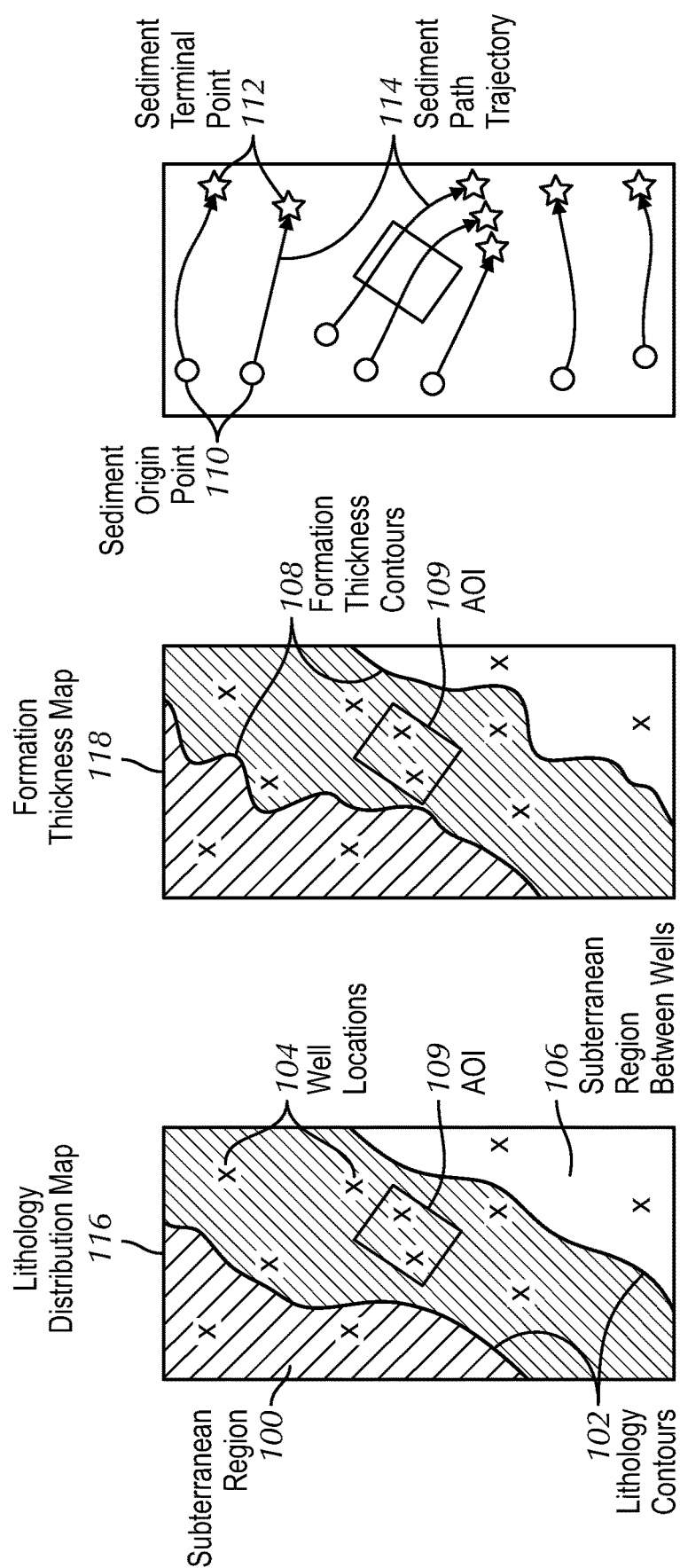
FIGS. 1A, 1B, and 1C show inputs to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Sedimentary rocks, in contrast to pure minerals, consist of accumulations of minerals, either as grains or rock fragments, resulting from erosion, sedimentation, and precipitation. They are associated with alluvial, fluvial, aeolian and marine processes. The term "lithology" as related to these sedimentary rocks describes the physical attributes of the rock, including the grain size and texture of the minerals and fragments comprising the rock such as fractions of sandstone, mudstone. Therefore, a "rock", in contrast to a "mineral", may be defined as a heterogeneous solid which is composed of one or more minerals whose mineral types, grain sizes, and textures determine its lithology. For example, in the case of rocks composed of silicate minerals, or siliciclastics, the grain sizes and texture will define whether the rock is a shale, siltstone, or sandstone. The lithology of carbonate rocks, which are predominantly composed of calcite and dolomite, may also be classified according to grain size.

Embodiments disclosed herein relate to the automatic definition of sedimentary fairways from sedimentary pathways. Further, embodiments of this disclosure describe the calculation of sediment volumetrics within the sedimentary fairways and along the sedimentary pathways included within the sedimentary fairways and intersecting an area of interest (AOI) that is for forward modelling or geological study. For example, the sediment volume may be a mass of sediment deposit of pebbles, sand and mud, and/or salts dissolved in water, transported by wind, water, or ice. This information may then be used to transform raw well information to specific input parameters for static or forward modelling and/or the information may be used as input to a workflow described herein. In one or more embodiments, the workflow includes 1) double clustering of start/end points of pathways, 2) automatic identification of sediment fairways, 3) combination with lithology/thickness maps to calculate fairway parameters, 4) automatic identification of input/output locations of Areas Of Interest, 5) subdivision of fairway to pathway specific domains, 6) calculation of volumetric profiles of pathway domains, and 7) combination with lithology/thickness to calculate parameters of input and output locations of the area of interest. The key output data are: 1) the fairway definition and their parameters, 2) the input and output locations per area of interest and their parameters.

FIGS. 1A-1C show examples of input data from raw well information and other sources that may be used to define sedimentary fairways and domains, in accordance with one or more embodiments. FIG. 1A shows a lithology distribution map (116) showing contours (102) of a lithology distribution for a subterranean region (100). The lithology distribution may be derived, at least in part, from petrophysical logs acquired in wells (104) located in, or near, the subterranean region (100). Alternatively, or in addition, lithology information may be obtained from cuttings descriptions. Input datasets such as the lithology distribution of FIG. 1A may include seismic data that are time-depth inverted and compared to well data in order to constrain lithology distribution in space within the area of interest. Lithology distributions provide the percentage of each lithofacies along depth in each well. The contours (102) of the lithological distribution for the subterranean regions between wells (106) may be obtained by performing interpolation between the wells (104). The interpolation may be performed using kriging, gridding, machine learning regression, or by any other suitable methods familiar to one of ordinary skill in the art. Seismic data may be used to constrain the interpolation of the lithology distribution from the wells (104) to the regions between wells (106). However, seismic data may not be essential to interpolating the lithological distribution.

FIG. 1A further shows an area of interest, (AOI) (109). An AOI (109) may be any portion of the subterranean region of particular interest to the user of embodiments disclosed herein. The AOI (109) may be of interest to the user for activities including, without limitation, planning hydrocarbon exploration, hydrogeology, engineering geology, gas or $CO_2$ storage, and waste storage. In one or more embodiments, the AOI is the area for e.g. forward modeling and is a subarea of a specific fairway or of several fairways, as discussed below.

According to one or more embodiments, FIG. 1B shows a formation thickness map (118) including the contours of the formation thickness (108) of the subterranean formation. Formation thickness maps (118) may be part of the input dataset for the workflow disclosed herein. The formation thickness maps (118) may be acquired either from interpolating formation thicknesses determined at well locations (104) or interpreted from time-depth converted seismic surfaces. The formation thickness maps (118) may be also used for volumetric calculations.

According to one or more embodiments, FIG. 1C shows sedimentary pathways that may also be used as input data. A sedimentary pathway describes the path followed by sediment in the geological past i.e., how in the geological past the sediment has cascaded within sedimentary system. A sedimentary pathway includes a sediment origin point (110), a sediment terminal point (112), and a sedimentary path trajectory (114) (or path trail) in space from the sediment origin point (110) to the sediment terminal point (112). The sedimentary pathways may be determined are expressions of gradient vectors from estimates of topographic surfaces in the geologic past and gradient of topographic surfaces in the geologic past, grain size gradients, or a combination of both the topographic surfaces and grain size gradients.

Figure 2:
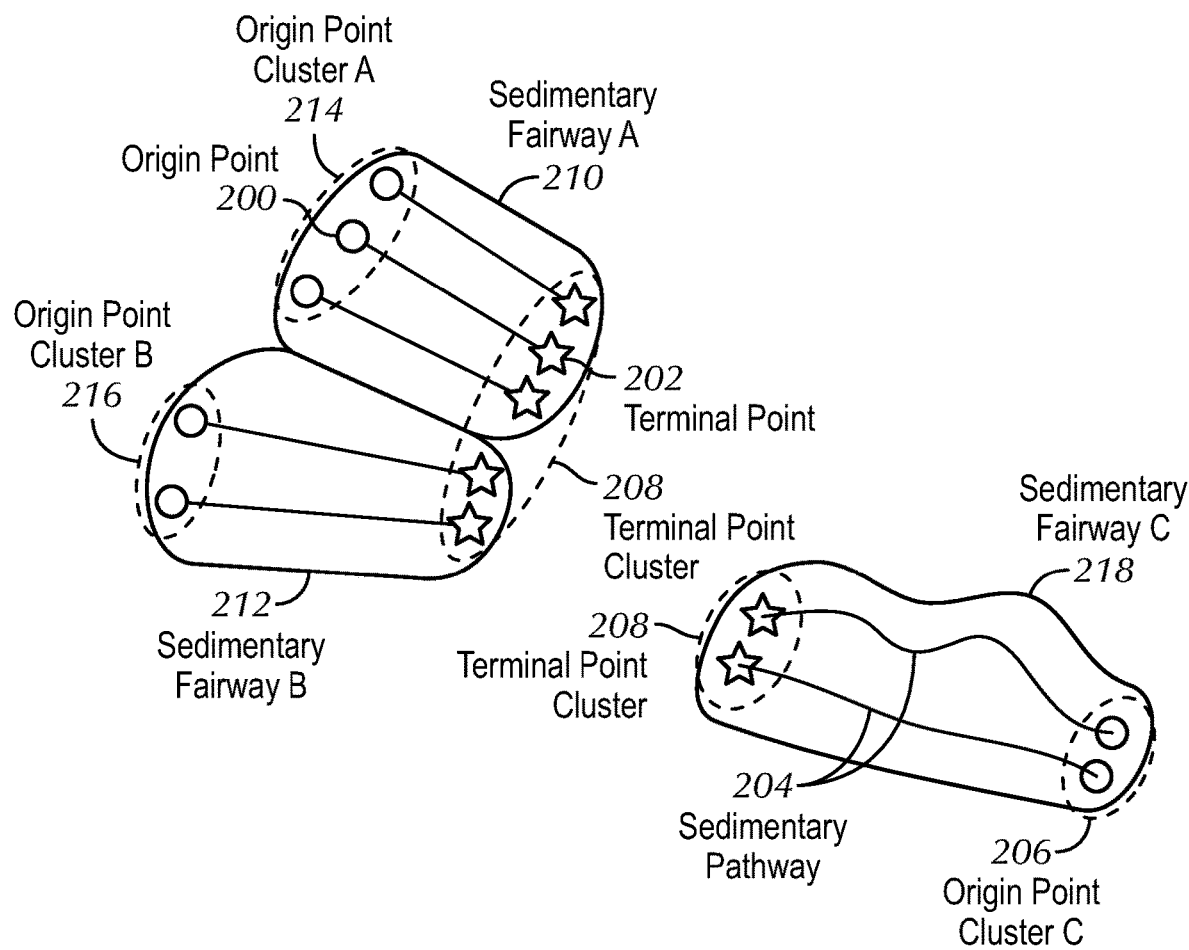
FIG. 2 shows sedimentary systems in accordance with one or more embodiments.

According to one or more embodiments, FIG. 2 shows a sedimentary system in which sediment is transported along the sedimentary pathways (204) from an origin point (200) where sediment is eroded to a terminal point (202) where the last of the sediment is deposited. Along the sedimentary pathway (204) between the origin point (200) and the terminal point (204) sediment with the largest grains is typically deposited first. Thus, the grain size of the sediment typically decreases along the sedimentary pathway (204) from the origin point (200) towards the terminal point (202). According to one or more embodiments, the geometry of the sedimentary pathways (204) may describe one or more routes that sediment took to travel from an origin point (200) to a terminal point (202).

In accordance with one or more embodiments, the origin points (200) may be clustered based upon their spatial locations in relationship to each other to form origin point clusters, e.g., Cluster A (214), Cluster B (216), and Cluster C (206). In accordance with one or more embodiments, the terminal points (202) may be clustered based upon their spatial locations in relationship to each other to form terminal point clusters (208). The origin and terminal points of the sedimentary pathways may be clustered into groups such that all the origin points of a group share a similar location and all the terminal points of the group share a similar location. This process may be denoted "double clustering" as it involves the clustering of both the origin points and the terminal points. The data points may be clustered with any one of a number of clustering algorithm well known to one of ordinary skill in the art. The data points may be clustered with the clustering algorithm known as "dbscan". The data points may be clustered with the clustering algorithm known as "kmeans". In accordance with some embodiments, the origin points (200) may be clustered first, and the terminal points (202) may be clustered second. In accordance with other embodiments, the terminal points (202) may be clustered first, and the origin points (200) may be clustered second.

In accordance with one or more embodiments, sedimentary pathways (204) whose origin points (200) form a common origin point cluster (206) and whose terminal points (202) form a common terminal point cluster (208) may be deemed to belong to the same sedimentary fairway, e.g. sedimentary fairway A (210), sedimentary fairway B (212), and sedimentary fairway C (218). In accordance with one or more embodiments, the sedimentary fairway may be defined as the areal/spatial footprint over which sediment in the geological past flowed from common origin points (206) to common terminal points (208). Sedimentary fairways represent a cluster of sedimentary pathways that have common, or similar origin points and common, or similar terminal points. A sedimentary fairway may have any number of sedimentary pathways.

Figure 3A:
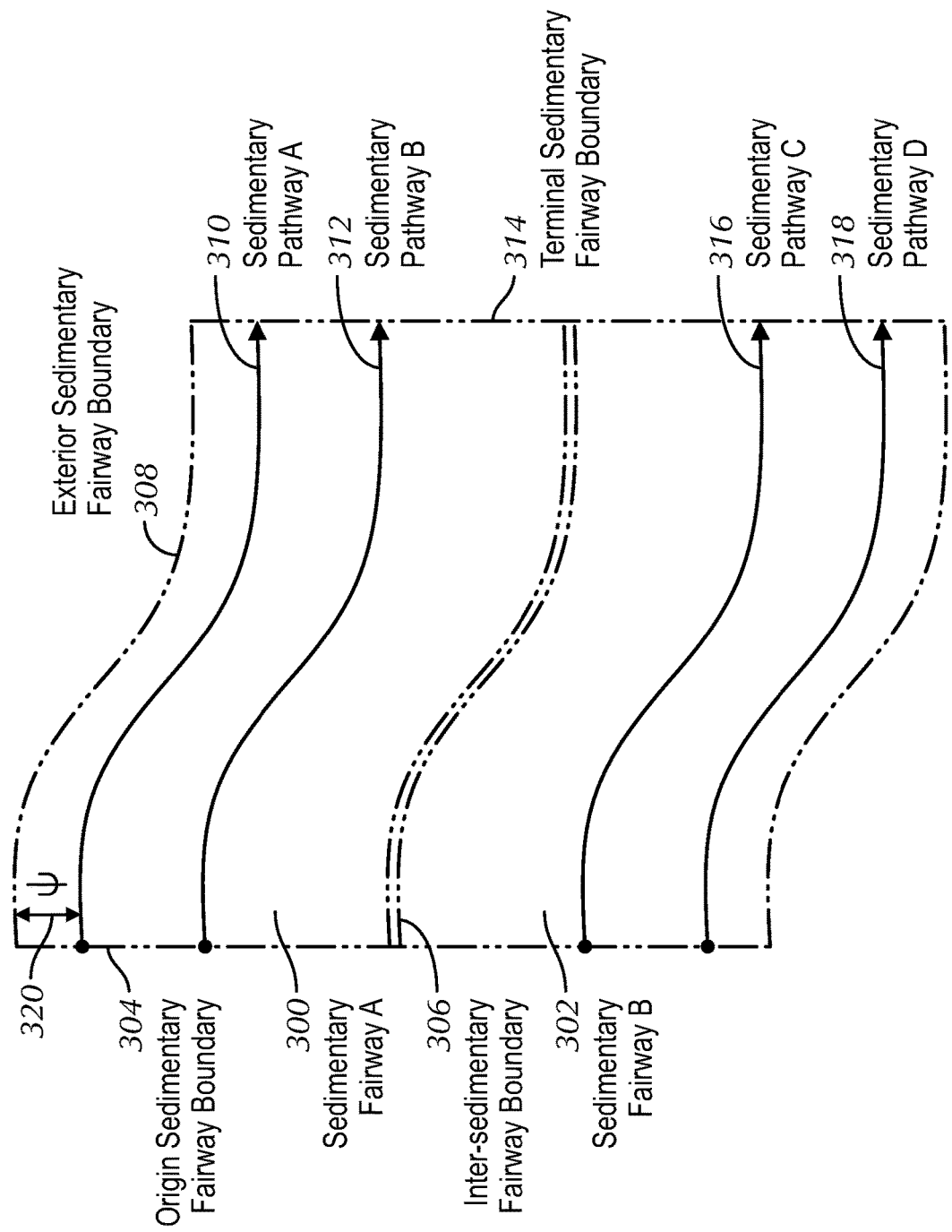
FIGS. 3A and 3B show sedimentary systems in accordance with one or more embodiments.

FIG. 3A illustrates, in accordance with one or more embodiments, the determination of the location of sedimentary fairway boundaries (304, 306, 308, 314). There are four distinct types of boundary: origin boundaries (304), terminal boundaries (314), boundaries between adjacent sedimentary fairways or "inter-sedimentary fairway" boundaries (306), and boundaries of sedimentary fairways where there is no adjacent sedimentary fairway or "exterior sedimentary fairway boundaries" (308).

An origin boundary (304) may be determined, in accordance with one or more embodiments, by connecting the origin points (200) associated with a sedimentary fairway together with linear line segments and extrapolating those line segments beyond the first and the last origin point of the sedimentary fairway (210).

A terminal boundary (314) may be determined in an analogous manner. Terminal boundaries (314) may be determined, in accordance with one or more embodiments, by connecting the terminal points (202) associated with a sedimentary fairway (214) together with linear line segments and extrapolating those line segments beyond the first and the last terminal point of the sedimentary fairway (210).

In accordance with one or more embodiments, an inter-sedimentary fairway boundary (306) between a sedimentary fairway A (300), and an adjacent sedimentary fairway B (302), may be determined by the locus of points that are equidistant from the sedimentary pathway in sedimentary fairway A that is closest to sedimentary fairway B (312) and the sedimentary pathway in sedimentary fairway B that is closest to sedimentary fairway A (316).

An exterior sedimentary fairway boundary (308) occurs where there is no adjacent sedimentary fairway. In accordance with one or more embodiments, the sedimentary fairway may be extended so the exterior sedimentary fairway boundary (308) encloses the entire subterranean region (100) for which sedimentary lithology map (116) or sedimentary thickness map (118) is available. In accordance with other embodiments, the sedimentary fairway (300) may be extended beyond the location of the sedimentary pathway (310), closest to the boundary of the sedimentary fairway (300), by a distance equal to the average separation between the sedimentary pathways, $\psi$, (320), where the average is calculated over the sedimentary fairway enclosing the sedimentary pathway (310).

Figure 3B:
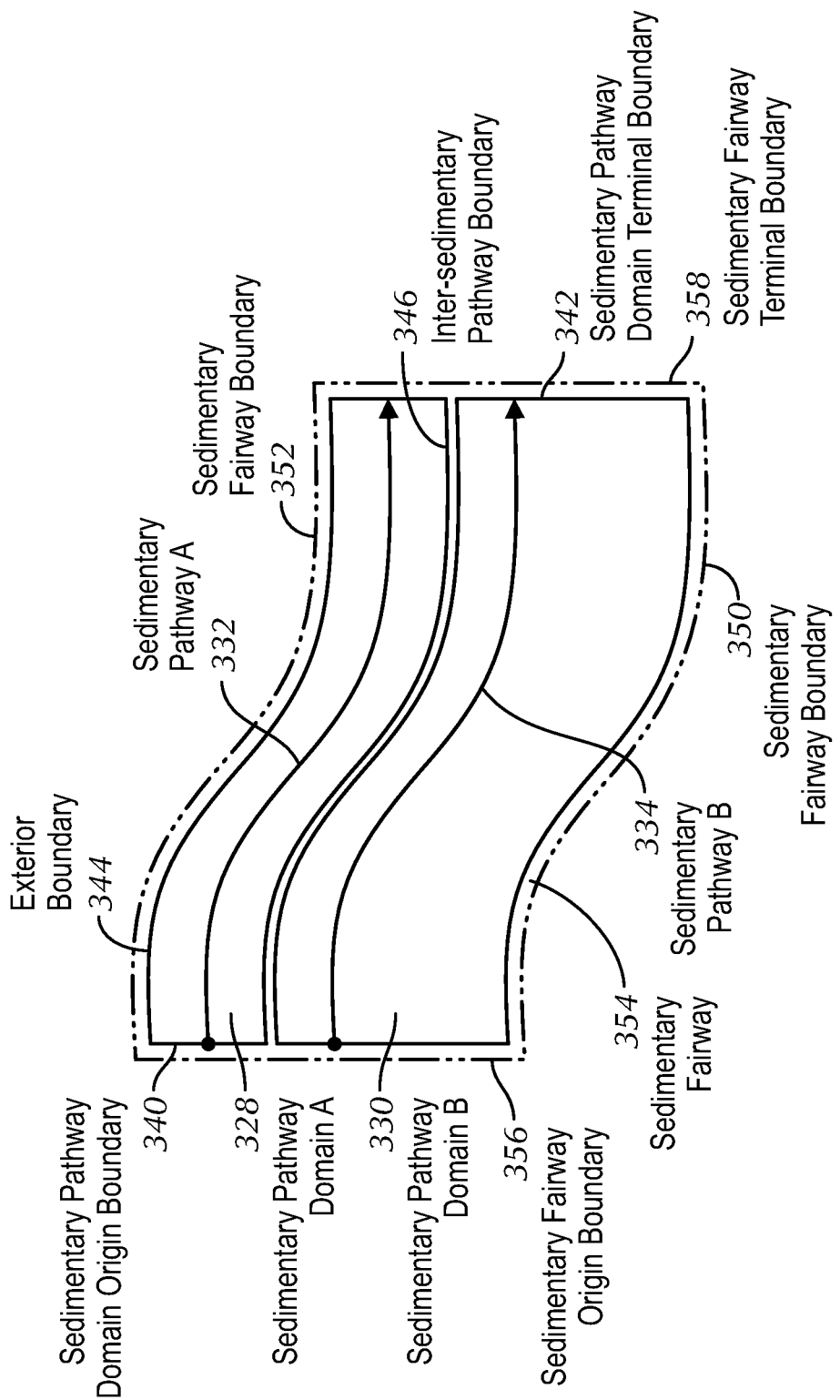

FIG. 3B illustrates, in accordance with one or more embodiments, the determination of the sedimentary pathway domains (328, 330) into which the sedimentary fairway (354) may be divided, and the location of sedimentary pathway domain boundaries (342, 344, 346, 348). A sedimentary fairway (354) may be divided into a plurality of non-overlapping sedimentary domains (328, 330) in such a manner that the sum of the spatial footprints of all the sedimentary domains (328, 330) within a sedimentary fairway (354) is exactly equal to the spatial footprint of the sedimentary fairway (354). Sedimentary pathway domains (328, 330) are formed by the lateral extension of sedimentary pathways (332, 334) in a direction orthogonal to the sedimentary pathway (332, 334) with which they are associated. Unlike a sedimentary pathway (332, 334), which a line, or a trajectory on a spatial map between an origin point (200) and a terminal point (202), a sedimentary pathway domain (328, 330) has a finite, non-zero, spatial area which extends on either side of the sedimentary pathway (332, 334).

A sedimentary pathway domain (328, 330) has four distinct types of boundaries: an origin boundary (340), a terminal boundary (342), and two type of lateral boundaries (344, 346). One type of lateral boundary occurs between adjacent sedimentary pathway domains, herein denoted an "inter-sedimentary pathway boundary" (346). A second type of lateral boundary of a sedimentary pathway domain occurs where there is no adjacent sedimentary pathway domain, herein denoted an "exterior boundary" (344).

In accordance with one or more embodiments, an inter-sedimentary pathway boundary (346) between a sedimentary pathway domain A (328) and an adjacent sedimentary pathway domain B (330) may be determined by the locus of points that are equidistant from the sedimentary pathway A (332) and sedimentary pathway B (334).

An exterior boundary (344) occurs where there is no adjacent sedimentary pathway. In accordance with one or more embodiments, the sedimentary pathway domain (328) may be extended so the exterior boundary (344) is coincident with the closest sedimentary fairway boundary (350, 352) of the sedimentary fairway (354) containing the sedimentary pathway domain (328).

An origin boundary (340) of the sedimentary pathway domain (328) may be determined, in accordance with one or more embodiments, to be coincident with the portion of the origin boundary of the sedimentary fairway (356) containing sedimentary pathway (332) lying between the intersection points of the lateral boundaries (344, 346) of the sedimentary pathway domain (328) and the origin boundary of the sedimentary fairway (356) containing sedimentary pathway (332, 334).

A terminal boundary (342) of the sedimentary pathway domain may be determined, in accordance with one or more embodiments, to be coincident with the portion of the terminal boundary of the sedimentary fairway (358) containing sedimentary pathway lying between the intersection points of the lateral boundaries of the sedimentary pathway domain and the terminal boundary of the sedimentary fairway containing sedimentary pathway.

Figure 4B:
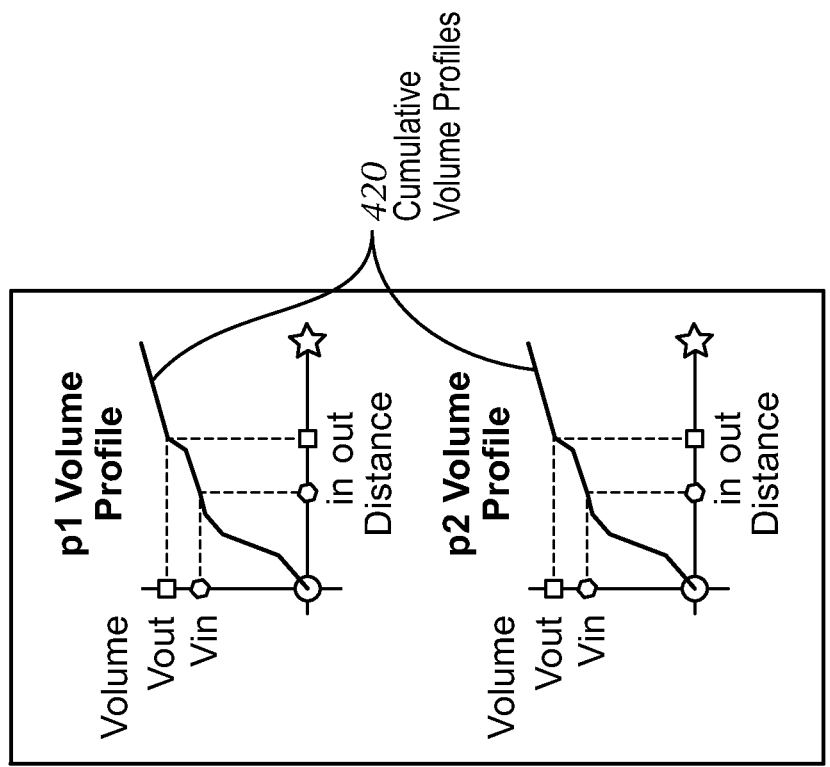
FIGS. 4A and 4B show examples in accordance with one or more embodiments.
Figure 4A:
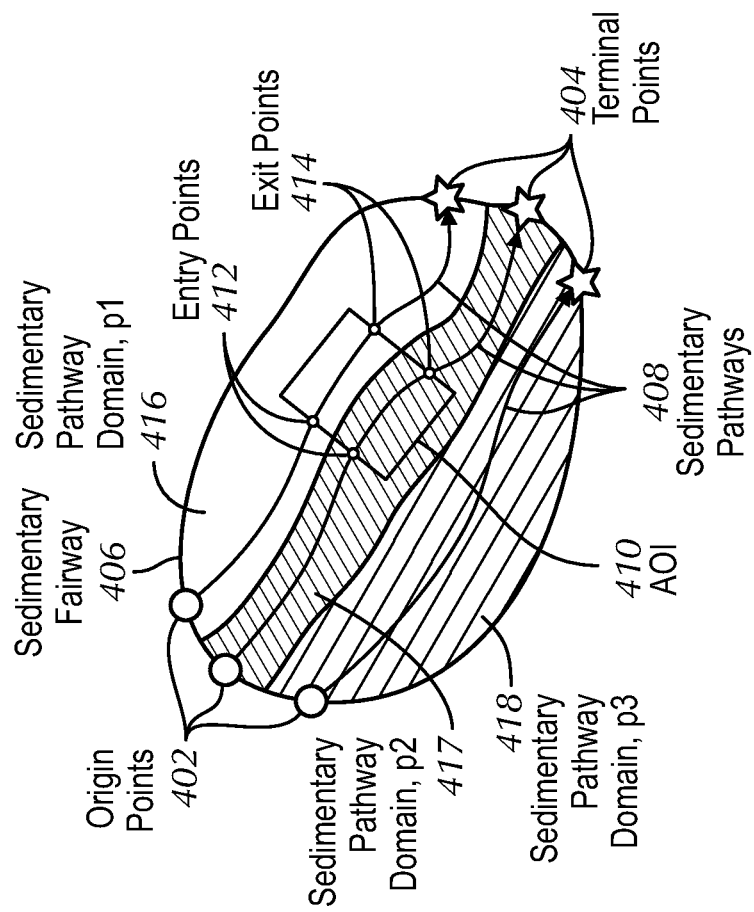

FIG. 4A shows, in accordance with one or more embodiments, an example of a sedimentary fairway (406) formed from a set of sedimentary pathways (408) including their clustered origin points (402) and their clustered terminal points (404). Furthermore, FIG. 4A shows an AOI (410) located wholly within a single sedimentary fairway (406). In some embodiments, an AOI (410) may straddle a plurality of sedimentary fairways (406). In these cases, the steps described below may be repeated for each sedimentary fairway (406) in turn, in a straight forward extension of the steps described herein.

According to one or more embodiments, the sedimentary pathways (408), AOI (410), and sedimentary fairway (406) shown in FIG. 4A may be combined with the lithology distribution map (116) and formation thickness map (118) (input discussed in FIGS. 1A-1C) to calculate the sedimentary fairway volumetrics, and sedimentary lithology distribution. Herein, we use the term volumetrics to collectively describe the sediment volume, and volume flux.

For example, if the formation thickness map (118) is described on a two dimension spatial grid, with the thickness of the $i^{th}$ cell along a first axis, and a $j^{th}$ cell along a second axis, denoted T(i,j), then the total sedimentary fairway volume, $V_{total}$, may be given by:

$$V_{total} = \sum_{\substack{0 \leq i \leq m \\ 0 < j < n}} T(i, j) * dx * dy \qquad (1)$$

where dx and dy denote the uniform grid spacing along the first and second grid axes, respectively. m and n denote the number of cells, within the fairway, along the first and second axes, respectively.

According to one or more embodiments, the lithology percentages for a sedimentary fairway (406), $V_\%$ (lith), may be determined by:

$$V_\%(lith) = \left[ \sum_{\substack{0 \leq i \leq m \\ 0 < j < n}} T(i, j) * dx * dy * f(i, j; lith) \right] / V_{total} \qquad (2)$$

where $V_{\%\,l}$ (lith) is the mean percentage abundance by volume of a particular lithology type lith averaged over the sedimentary fairway (406), and f (i, j; lith) is the volume percentage of the particular lithology type lith for the cell (x=i, y=j). f (i, j; lith) may be determined from the lithology distribution map (116).

FIG. 4A shows the entry points (412) to, and exit points (414) from, an AOI (410) for two sedimentary pathways (408), in accordance with one or more embodiments. In many cases there may be tens, or hundreds, of sedimentary pathways (408) intersecting with an AOI (410), so manual determination of entry points (412) and exit points (414) is unfeasible. Many automatic methods for determining the intersection points of a curve with an area are known to someone of ordinary skill in the art and these automatic methods may be used to determine the entry points (412) and exit points (414) of the sedimentary pathway to, and from, the AOI (410).

In the example illustrated, each sedimentary pathway (408) enters the AOI (410) at a single entry point (412) and exits the AOI (410) at a single exit point (414). However, in general in accordance with one or more embodiments, each sedimentary pathway (408) may enter and exit the AOI (410) once, or a plurality of times. Many automatic methods for determining a plurality of intersection points of a curve with an area are known to someone of ordinary skill in the art and these methods may be used to automatically determine multiple sedimentary pathway (408) entry points (412) and exit points (414).

FIG. 4A further illustrates the division of a sedimentary fairway into sedimentary pathway domains (416, 417, 418). According to one or more embodiments, sedimentary pathway domains may be determined after the boundaries of the sedimentary fairways are determined in the manner illustrated in FIG. 3B and described above.

FIG. 4A illustrates an example of a sedimentary fairway enclosing three sedimentary pathway domains, denoted as p1 (416), p2 (417) and p3 (418). Sedimentary pathway domains p1 and p2 intersect the AOI (410) and may be used in a volumetric and a lithology determination for the AOI (410). In contrast, sedimentary pathway domain p3 does not intersect the AOI (410) and is not used in the volumetric and lithology calculations for the AOI (410).

FIG. 4B depicts the cumulative volume profile, (420), CV (x; A, T), for the sedimentary pathway domains, p1 (416) and p2 (417), in accordance with one or more embodiments. The cumulative sediment volume profile (420) may be determine by integrating a sediment pathway domain width-weighted sedimentary thickness over the sedimentary pathway:

$$CV(x; A, T) = \int_0^x T(x') * A(x') * dx' \qquad (3)$$

where T(x') is the mean thickness of the sedimentary pathway domain (416, 417) at the point x, and the A(x') is the width of the sedimentary pathway domain at the point x. Further, dx' is the incremental distance measured along the sedimentary pathway (408) beginning at the sedimentary pathway origin point (402), x=0, and ending at the terminal point (404), x=l.

Furthermore, in accordance with one or more embodiments, the sedimentary volume which has entered the AOI (410), Vin, may be expressed as:

$$Vin = CV(x=l) - CV(x=in) \qquad (4)$$

where x=in denotes the distance between the origin point (402) and the entry point (412) measured along the sedimentary pathway (408). Similarly, the sedimentary volume which has exited the AOI (410), Vout, may be expressed as:

$$Vout = CV(x=l) - CV(x=out) \qquad (5)$$

In accordance with one or more embodiments, a cumulative lithology volume profile CLV (x; A, T, lith) may be determined from the lithology distribution map (106) integrating a sedimentary pathway domain width-weighted sedimentary lithology over the sedimentary pathway:

$$CLV(x; lith) = \int_0^x T(x') * A(x') * f(x'; lith) * dx' \qquad (6)$$

where f (x'; lith) is the volume percentage of the particular lithology type lith at the point x'.

Figure 5:
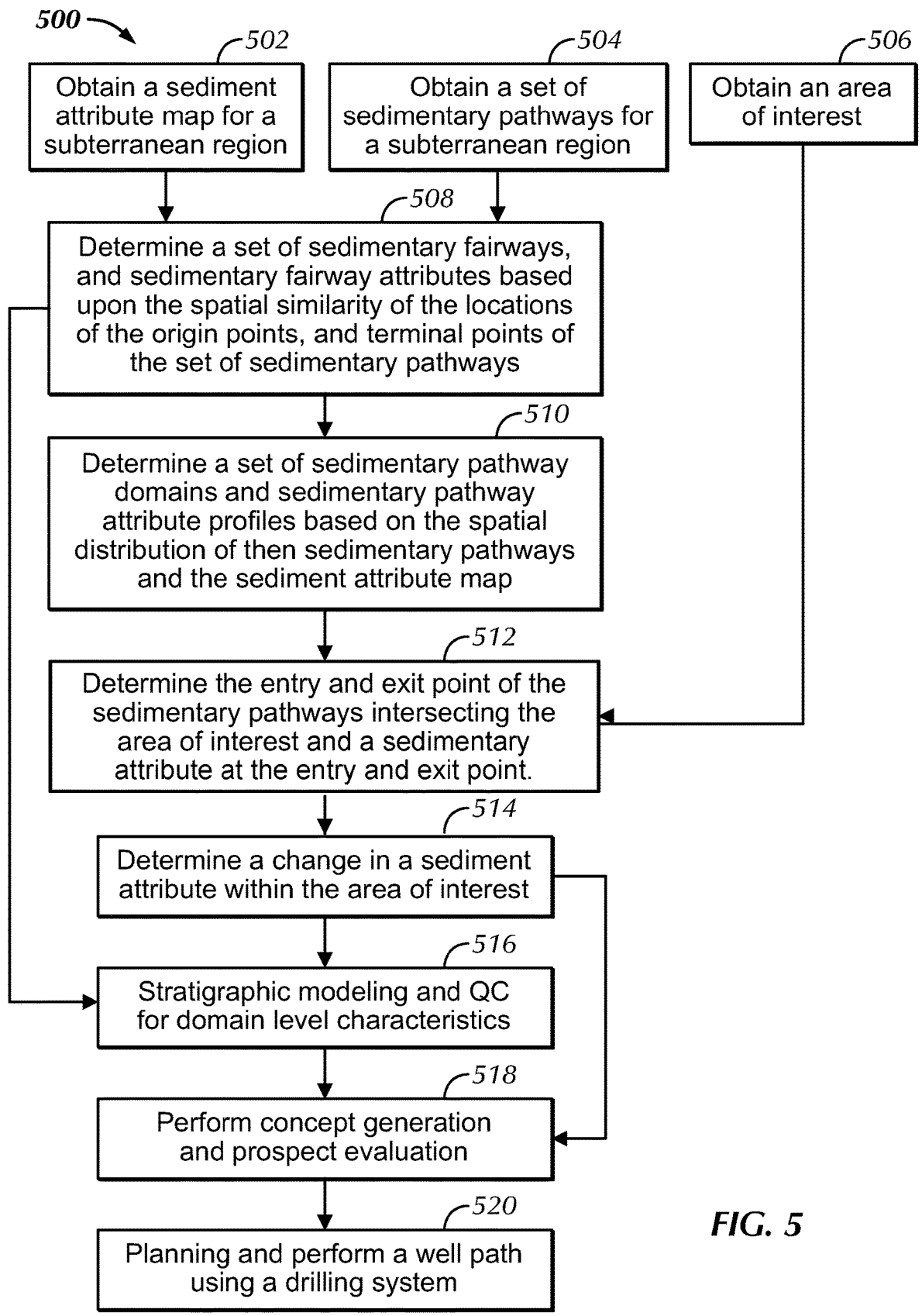
FIG. 5 shows a flowchart in accordance with one or more embodiments.

FIG. 5 shows a flowchart for determining a sedimentary fairway, sedimentary fairway attributes, a set of sedimentary pathway domains and sedimentary pathway attribute profile, entry and exit points of a sedimentary pathway to an AOI, changes in sedimentary attributes within an AOI, and planning and performing a well path using a drilling system, in accordance with one or more embodiments. One or more blocks in FIG. 5 may be performed using one or more components as described in FIGS. 2 through 4B. While the various blocks in FIG. 5 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

In accordance with one or more embodiments, in Block 502, a sediment attribute map for a subterranean region (100) may be obtained. The sediment attribute map may be a formation thickness map (118) and/or a lithology distribution map (116). The lithology distribution map (116) may show contours (102) of sediment attributes such as grain size, or sandstone fraction. The lithology distribution map (116) may be derived from petrophysical logs acquired in wells (104) located in, or near, the subterranean region (100). The contours (102) of the lithological distribution for the subterranean region not intersected by a well (106) may be obtained by performing interpolation between the wells (104). Seismic data may be used to constrain the interpolation of the lithology distribution from the wells (104) to the region not intersected by a well (106). However, seismic data may not be essential to interpolating the lithological distribution.

According to one or more embodiments, the formation thickness contours (108) of the formation thickness map may be determined by interpolating formation thicknesses recorded at well locations (104), from time-depth converted seismic surfaces or from a combination of formation thicknesses recorded at well locations (104) and time-depth converted seismic surfaces.

In Block 504, in accordance with one or more embodiments, a set of sedimentary pathways for the subterranean region is obtained. The sedimentary pathways transport sediment from sediment origin points (110) to sediment terminal points (112) along a sedimentary path trajectory (114) in the subterraneous region (100) according to one or more embodiments. There may be many hundreds of sedimentary pathways, with their associated origin and terminal point pairs. Manual clustering of these sedimentary pathways and associated origin and terminal points may be extremely time-consuming, and error prone. Accordingly, this process is automated and may be performed by a computing device (700) such as that shown in FIG. 7 below.

In Block 506, according to one or more embodiments, an AOI is obtained for a subterraneous region (100). An AOI may be any portion of the subterranean region of particular interest to the user of the embodiment. The use of an AOI may pertain to activities including, without limitation, planning hydrocarbon exploration, hydrogeology, engineering geology, gas or CO2 storage, and waste storage.

Those skilled in the art will appreciate that Blocks 502-506 are inputs to the workflow to calculate entry and exit points of a sediment domains and may be performed in parallel or sequentially.

In Block 508, the double clustering approach may be applied to for automatic picking of the sedimentary fairways (300, 302, 354) according to one or more embodiments. According to one or more embodiments, the terminal points may be clustered with any one of a number of clustering algorithm well known to one of ordinary skill in the art. The terminal points may be clustered with the clustering algorithm known as "dbscan". The terminal points may be clustered with the clustering algorithm known as "kmeans". In the first clustering pass all the sedimentary pathways are collected that have the same or similar terminal points or the same sink in this system.

According to one or more embodiments, different sedimentary fairways may have similar or adjacent terminal points (208) but may have different origin point locations (214, 216) therefore belong to different sedimentary fairways (210, 212). According to one or more embodiments, a second clustering pass may be applied to the origin points (214, 216). The origin points may be clustered with any one of a number of clustering algorithm well known to one of ordinary skill in the art. The origin points may be clustered with the clustering algorithm known as "dbscan". The origin points may be clustered with the clustering algorithm known as "kmeans".

According to one or more embodiments, the double clustering process automates the determination of sedimentary fairways (210, 212) in the subterranean region. In Block 508, the sedimentary fairways and sedimentary fairway attributes are determined based, at least in part, upon the spatial similarity of the locations of the origin points (206, 214, 216) and terminal points (208) of the set of sedimentary pathways according to one or more embodiments.

In Block 510, according to one or more embodiments, a set of sedimentary pathway domains (328, 338) and sedimentary pathway attribute profiles is estimated based, at least in part, upon the spatial distribution of the sedimentary pathways (330, 336) and sediment attribute maps (102, 108). According to one or more embodiments, the sedimentary fairway may be combined with the lithology distribution map (116) and formation thickness map (118) to calculate the sedimentary volumes, sedimentary volume fluxes, and sediment lithology distribution.

In Block 512 the entry point (412) and exit point (414) of the sedimentary pathway (408) to and from the AOI (410) may be determined, in accordance with one or more embodiments. The sedimentary pathway (408) entry point (412) and exit point (414) may be used together with equations (4) and (5) to calculate sediment volume that entered the AOI (410) in the geological past. According to one or more embodiments, the identification of sediment entry point (412), and exit point (414) depends on the direction of sediment flow along the sedimentary pathway (408). In general, a sedimentary pathway (408) may enter and exit the AOI (410) in a plurality of locations.

In Block 514, in accordance with one or more embodiments, a spatial change in the sediment attribute between the entry point (412) of the sedimentary pathway into the AOI (410) and the exit point (414) of the sedimentary pathway out of AOI (410) may be determined. The sediment attribute may include a sediment entry point (412) and an exit point (414) location, the input and output sediment volume, and the input and output sediment lithology distribution of the specific sedimentary pathways intersecting the AOI (410).

In Block 516 the sedimentary attributes, and the changes of sedimentary attributes, within the AOI may be used for stratigraphic modeling, in accordance with one or more embodiments. Stratigraphic modeling may include, without limitation, geological, static and forward modelling of geological sediment volumes and lithology attributes. Further in Block 516, in accordance with one or more embodiments, the sedimentary fairway attributes may be combined with the sedimentary attributes, and the changes of sedimentary attributes, within the AOI to control the quality of the determined sedimentary attributes and the stratigraphic modeling.

Embodiments disclosed herein describe how to reconstruct locations of sediment input and output and how to calculate sediment volumes/time (flux) and lithology/grain size distribution for each sediment input and output location for a given AOI. Potential applications of embodiments described herein include, but are not limited to, static and forward stratigraphic modeling of subsurface sedimentary basin fills in e.g., hydrocarbon exploration, hydrogeology, engineering geology, gas and CO2 storage and waste storage. For example, in Block 518, in accordance with one or more embodiments, the sedimentary attributes determined in Block 514 and the results of the stratigraphic modeling determined in Block 516 may be used for concept generation and prospect evaluation. Concept generation and prospect evaluation are multi-disciplinary workflows to determine the presence and location of recoverable hydrocarbon reserves, and to estimate the uncertainty in those determination. These workflows require an understanding of the subterranean sedimentary geology including sedimentary fairways, sedimentary pathways and sedimentary attributes, as well as factors such as production costs, product prices, and political and fiscal risks.

In Block 520, in accordance to one or more embodiments, the sedimentary attributes determined in Block 514, the results of the stratigraphic modeling determined in Block 516, and the output of the concept generation and prospect evaluation Block 518 may be used for planning and performing a well path using a drilling system.

Figure 6A:
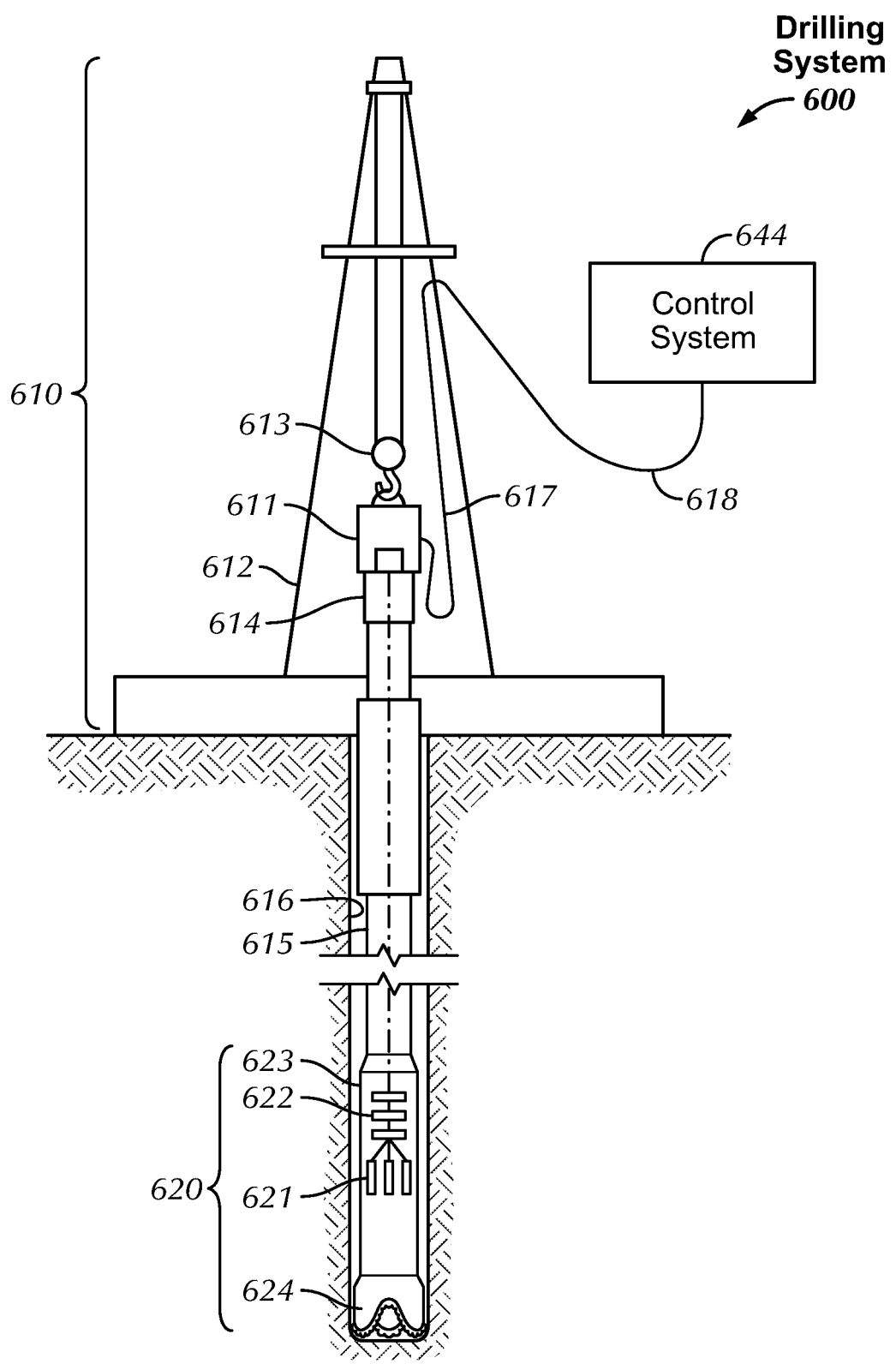
FIGS. 6A and 6B show geosteering systems in accordance with one or more embodiments.
Figure 6B:
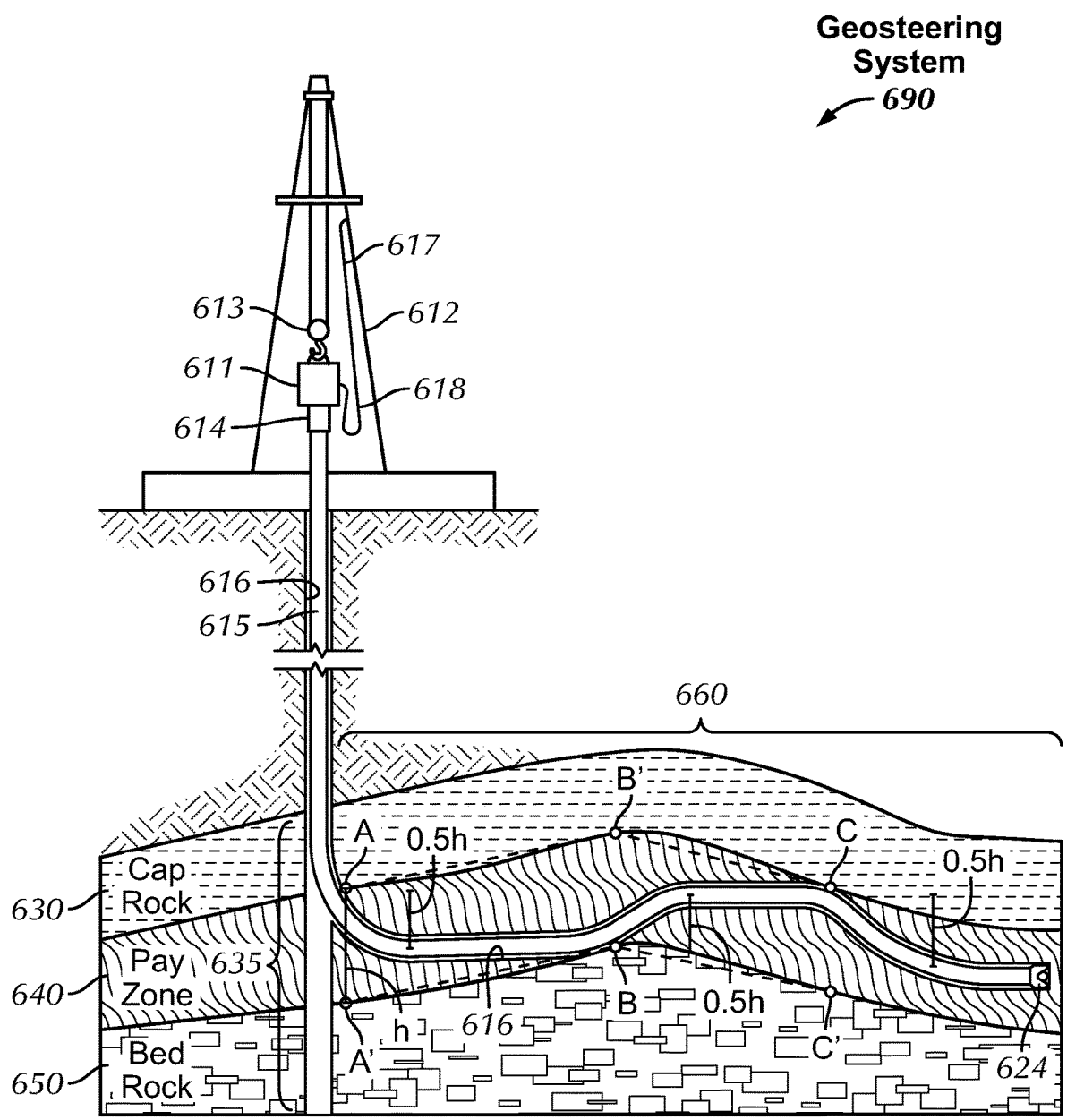

For example, this technology may be used in geosteering. FIGS. 6A and 6B illustrate systems for geosteering in accordance with one or more embodiments. As shown in FIG. 6A, a drilling system (600) may include a top drive drill rig (610) arranged around the setup of a drill bit logging tool (620). A top drive drill rig (610) may include a top drive (611) that may be suspended in a derrick (612) by a travelling block (613). In the center of the top drive (611), a drive shaft (614) may be coupled to a top pipe of a drill string (615), for example, by threads. The top drive (611) may rotate the drive shaft (614), so that the drill string (615) and a drill bit logging tool (620) cut the rock at the bottom of a wellbore (616). A power cable (617) supplying electric power to the top drive (611) may be protected inside one or more service loops (618) coupled to a control system (644). As such, drilling mud may be pumped into the wellbore (616) through a mud line, the drive shaft (614), and/or the drill string (615).

Moreover, when completing a well, casing may be inserted into the wellbore (616). The sides of the wellbore (616) may require support, and thus the casing may be used for supporting the sides of the wellbore (616). As such, a space between the casing and the untreated sides of the wellbore (616) may be cemented to hold the casing in place. The cement may be forced through a lower end of the casing and into an annulus between the casing and a wall of the wellbore (616). More specifically, a cementing plug may be used for pushing the cement from the casing. For example, the cementing plug may be a rubber plug used to separate cement slurry from other fluids, reducing contamination and maintaining predictable slurry performance. A displacement fluid, such as water, or an appropriately weighted drilling mud, may be pumped into the casing above the cementing plug. This displacement fluid may be pressurized fluid that serves to urge the cementing plug downward through the casing to extrude the cement from the casing outlet and back up into the annulus.

As further shown in FIG. 6A, sensors (621) may be included in a sensor assembly (623), which is positioned adjacent to a drill bit (624) and coupled to the drill string (615). Sensors (621) may also be coupled to a processor assembly (623) that includes a processor, memory, and an analog-to-digital converter (622) for processing sensor measurements. For example, the sensors (621) may include acoustic sensors, such as accelerometers, measurement microphones, contact microphones, and hydrophones. Likewise, the sensors (621) may include other types of sensors, such as transmitters and receivers to measure resistivity, gamma ray detectors, etc. The sensors (621) may include hardware and/or software for generating different types of well logs (such as acoustic logs or density logs) that may provide well data about a wellbore, including porosity of wellbore sections, gas saturation, bed boundaries in a geologic formation, fractures in the wellbore or completion cement, and many other pieces of information about a formation. If such well data is acquired during drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (600) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as updating the geological model of the reservoir to revise the expected location of the most productive pay-zones within the reservoir, planning and updating the planned well trajectory during performance of the drilling, and steering a drill bit using geosteering, and choosing casing points, casing shoe positioning, and other well completion decisions.

The control system (644) may be coupled to the sensor assembly (623) in order to perform various program functions for up-down steering and left-right steering of the drill bit (624) through the wellbore (616). More specifically, the control system (644) may include hardware and/or software with functionality for geosteering a drill bit through a formation in a lateral well using sensor signals, such as drilling acoustic signals or resistivity measurements. For example, the formation may be a reservoir region, such as a pay zone, bed rock, or cap rock.

Turning to geosteering, geosteering may be used to position the drill bit (624) or drill string (615) relative to a boundary between different subsurface layers (e.g., overlying, underlying, and lateral layers of a pay zone) during drilling operations. In particular, measuring rock properties during drilling may provide the drilling system (600) with the ability to steer the drill bit (624) in the direction of desired hydrocarbon concentrations. As such, a geosteering system may use various sensors located inside or adjacent to the drilling string (615) to determine different rock formations within a wellbore's path. In some geosteering systems, drilling tools may use resistivity or acoustic measurements to guide the drill bit (624) during horizontal or lateral drilling.

Turning to FIG. 6B, FIG. 6B illustrates some embodiments for steering a drill bit through a lateral pay zone using a geosteering system (690). As shown in FIG. 6B, the geosteering system (690) may include the drilling system (600) from FIG. 6A. In particular, the geosteering system (690) may include functionality for monitoring various sensor signatures (e.g., an acoustic signature from acoustic sensors) that gradually or suddenly change as a well path traverses a cap rock (630), a pay zone (640), and a bed rock (650). Because of the sudden change in lithology between the cap rock (630) and the pay zone (640), for example, a sensor signature of the pay zone (640) may be different from the sensor signature of the cap rock (630). When the drill bit (624) drills out of the pay zone (640) into the cap rock (630), a detected amplitude spectrum of a particular sensor type may change suddenly between the two distinct sensor signatures. In contrast, when drilling from the pay zone (640)

downward into the bed rock (650), the detected amplitude spectrum may gradually change.

During the lateral drilling of the wellbore (616), preliminary upper and lower boundaries of a formation layer's thickness may be derived from a geophysical survey and/or an offset well obtained before drilling the wellbore (616). If a vertical section (635) of the well is drilled, the actual upper and lower boundaries of a formation layer (i.e., actual pay zone boundaries (A, A')) and the pay zone thickness (i.e., A to A') at the vertical section (635) may be determined. Based on this well data, an operator may steer the drill bit (624) through a lateral section (660) of the wellbore (616) in real time. In particular, a logging tool may monitor a detected sensor signature proximate the drill bit (624), where the detected sensor signature may continuously be compared against prior sensor signatures, e.g., of the cap rock (630), pay zone (640), and bed rock (650), respectively. As such, if the detected sensor signature of drilled rock is the same or similar to the sensor signature of the pay zone (640), the drill bit (624) may still be drilling in the pay zone (640). In this scenario, the drill bit (624) may be operated to continue drilling along its current path and at a predetermined distance (0.5 h) from a boundary of a formation layer. If the detected sensor signature is same as or similar to the prior sensor signatures of the cap rock (630) or the bed rock (650), respectively, then the control system (644) may determine that the drill bit (624) is drilling out of the pay zone (640) and into the upper or lower boundary of the pay zone (640). At this point, the vertical position of the drill bit (624) at this lateral position within the wellbore (616) may be determined and the upper and lower boundaries of the pay zone (640) may be updated, (for example, positions B and C in FIG. 6B). In some embodiments, the vertical position at the opposite boundary may be estimated based on the predetermined thickness of the pay zone (640), such as positions B' and C'.

While FIGS. 6A, and 6B shows various configurations of components, other configurations may be used without departing from the scope of the disclosure. For example, various components in FIGS. 6A, and 6B may be combined to create a single component. As another example, the functionality performed by a single component may be performed by two or more components.

Figure 7:
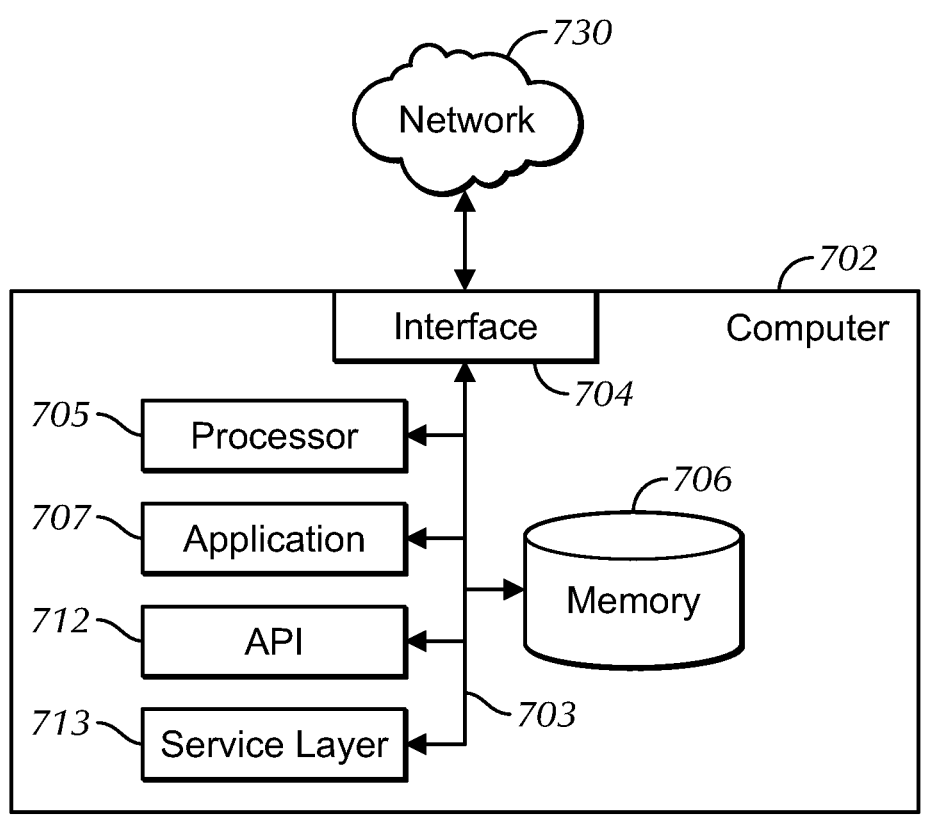
FIG. 7 shows a computer system in accordance with one or more embodiments.

Embodiments may be implemented on a computer system. FIG. 7 is a block diagram of a computer system (702) used to provide computational functionalities associated with described algorithms, methods, functions, processes, flows, and procedures as described in the instant disclosure, according to an implementation. For example, the computer (702) may be used to execute the pathway identification software and the automated workflow to quantitatively analyze major parameters for any geological modelling, including static and forward stratigraphic modelling.

The illustrated computer (702) is intended to encompass any computing device such as a high performance computing (HPC) device, server, desktop computer, laptop, notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704 includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
    obtaining, for a subterranean region, a set of sedimentary pathways, a map of a sediment attribute, and an area of interest;
    determining, using a computer processor, a sedimentary fairway and a sedimentary fairway attribute based, at least in part, on a spatial location of an origin point of each member of the set of sedimentary pathways and a spatial location of a terminal point of each member of the set of sedimentary pathways;
    forming, using the computer processor, at least one sedimentary pathway domain from each sedimentary fairway;
    determining, using the computer processor, a sediment attribute profile for each sedimentary pathway domain based, at least in part, on the map of the sediment attribute and a trajectory of each sedimentary pathway;
    determining, using the computer processor, an intersection of the trajectory of each sedimentary pathway with a boundary of the area of interest;
    determining, using the computer processor, a spatial change in the sediment attribute within the area of interest based, at least in part, on the sediment attribute profile for each sedimentary pathway domain and the intersection of the trajectory of each sedimentary pathways; and
    determining, using the computer processor, a location of a hydrocarbon reserve using the spatial change in the sediment attribute.

2. The method of claim 1, further comprising:
    planning a well path through the subterranean region based, at least in part, on the spatial change in the sediment attribute within the area of interest; and
    drilling a wellbore along the well path using a drilling system.

3. The method of claim 2,
    wherein planning the well path through the subterranean region comprises:
    determining, using the computer processor, a continuous locus of points each with an advantageous value of the sediment attribute through the subterranean region.

4. The method of claim 1, wherein the map of the sediment attribute comprises a sediment thickness map.

5. The method of claim 4, wherein the map of the sediment attribute comprises a lithology distribution map.

6. The method of claim 1, wherein forming at least one sedimentary pathway domain comprises:
    identifying, using the computer processor, a spatial region comprising locations closer than half of a distance between the sedimentary pathway and an adjacent sedimentary pathway.

7. The method of claim 1, wherein generating the sediment attribute profile comprises:

generating, using the computer processor, a cumulative sediment volume profile based in part on integrating a sedimentary pathway domain width-weighted sedimentary thickness over the sedimentary pathway.

8. The method of claim 1, wherein generating the sediment attribute profile comprises:
determining, using the computer processor, a cumulative sediment lithology volume profile based in part on integrating a sedimentary pathway domain width-weighted lithology over the sedimentary pathway.

9. The method of claim 1,
wherein determining the sedimentary fairway comprises:
identifying, using the computer processor, a subset of the set of sedimentary pathway domains that share both spatially similar origin points and share spatially similar terminal points; and
assigning, using the computer processor, a spatial extent of the sedimentary fairway to be a cumulative spatial extent of the subset of sedimentary pathway domains.

10. The method of claim 1,
wherein determining the intersection of the trajectory of each sedimentary pathway with the boundary of the area of interest comprises:
locating, using the computer processor, an entry point for the trajectory to the area of interest; and
locating, using the computer processor, an exit point for the trajectory from the area of interest.

11. The method of claim 1,
wherein determining the spatial change in the sediment attribute within the area of interest comprises:
calculating, using the computer processor, a difference between a value of the sediment attribute at an exit point of the area of interest and a value of the sediment attribute at an entry point of the area of interest.

12. A non-transitory computer readable medium storing instructions executable by a computer processor, the instructions comprising functionality for:
obtaining, for a subterranean region, a set of sedimentary pathways, a map of a sediment attribute, and an area of interest;
determining a sedimentary fairway and a sedimentary fairway attribute based, at least in part, on a spatial location of an origin point of each member of the set of sedimentary pathways and a spatial location of a terminal point of each member of the set of sedimentary pathways;
forming at least one sedimentary pathway domain from each sedimentary fairway;
determining a sediment attribute profile for each sedimentary pathway domain based, at least in part, on the map of the sediment attribute and a trajectory of each sedimentary pathway;
determining an intersection of the trajectory of each sedimentary pathway with a boundary of the area of interest;
determining a spatial change in the sediment attribute within the area of interest based, at least in part, on the sediment attribute profile for each sedimentary pathway domain and the intersection of the trajectory of each sedimentary pathways;
determining a location of a hydrocarbon reserve using the spatial change in the sediment attribute; and
planning a well path through the subterranean region based, at least in part, on the spatial change in the sediment attribute within the area of interest.

13. A system, comprising:
a computer processor configured to:
obtain, for a subterranean region, a set of sedimentary pathways, a map of a sediment attribute, and an area of interest;
determine a sedimentary fairway and a sedimentary fairway attribute based, at least in part, on a spatial location of an origin point of each member of the set of sedimentary pathways and a spatial location of a terminal point of each member of the set of sedimentary pathways;
form at least one sedimentary pathway domain from each sedimentary fairway;
determine a sediment attribute profile for each sedimentary pathway domain based, at least in part, on the map of the sediment attribute and a trajectory of each sedimentary pathway;
determine an intersection of the trajectory of each sedimentary pathway with a boundary of the area of interest;
determine a spatial change in the sediment attribute within the area of interest based, at least in part, on the sediment attribute profile for each sedimentary pathway domain and the intersection of the trajectory of each sedimentary pathway;
determine a location of a hydrocarbon reserve using the spatial change in the sediment attribute; and
plan a well path through the subterranean region based, at least in part, on the spatial change in the sediment attribute within the area of interest; and
a drilling system to drill a wellbore along the well path.

14. The system of claim 13, wherein the computer processor is further configured to:
generate a sediment thickness map.

15. The system of claim 13, wherein the computer processor is further configured to:
generate a lithology distribution map.

16. The system of claim 13, wherein the computer processor is further configured to:
identify a spatial region comprising locations closer than half of a distance between the sedimentary pathway and an adjacent sedimentary pathway.

17. The system of claim 13, wherein the computer processor is further configured to:
generate a cumulative sediment volume profile based in part on integrating a sedimentary pathway domain width-weighted sedimentary thickness over the sedimentary pathway.

18. The system of claim 13, wherein the computer processor is further configured to:
determine a cumulative sediment lithology volume profile based in part on integrating a sedimentary pathway domain width-weighted sedimentary lithology over the sedimentary pathway.

19. The system of claim 13, wherein the computer processor is further configured to:
locate an entry point for the trajectory to the area of interest; and
locate an exit point for the trajectory from the area of interest.

20. The system of claim 13, wherein the computer processor is further configured to:
calculate a difference between a value of the sediment attribute at an exit point of the area of interest and a value of the sediment attribute at an entry point of the area of interest.

* * * * *